United States Patent [19]

Carlson

[11] 4,264,053
[45] Apr. 28, 1981

[54] TOP OPERATED OUTLET VALVE WITH UNITARY CLOSURE GUIDE AND RETAINER

[75] Inventor: Edwin S. Carlson, St. Charles, Mo.

[73] Assignee: ACF Industries, Incorporated, New York, N.Y.

[21] Appl. No.: 68,140

[22] Filed: Aug. 20, 1979

[51] Int. Cl.³ .......................... F16K 1/48; F16K 27/03
[52] U.S. Cl. ...................................... 251/144; 251/264
[58] Field of Search .................. 251/144, 84, 86, 264; 137/347, 350

[56] References Cited

U.S. PATENT DOCUMENTS

| | | | |
|---|---|---|---|
| Re. 17,022 | 7/1928 | Wilson | 251/264 |
| 691,477 | 1/1902 | Murphy | 251/264 X |
| 1,556,270 | 10/1925 | Welle | 251/264 X |
| 1,784,460 | 12/1930 | McBride | 251/144 X |
| 1,899,938 | 3/1933 | Buenger | 251/144 X |
| 2,201,805 | 5/1940 | Willoughby | 251/144 |

Primary Examiner—William R. Cline
Attorney, Agent, or Firm—Henry W. Cummings

[57] ABSTRACT

In accordance with the present invention, a top operated tank car valve assembly includes a rod extending downwardly from the top of the tank and attached to a valve stem of a lading valve located in the bottom of the tank. A valve seat for the lading valve is located in an opening in the tank bottom and a valve cage includes circumferentially spaced openings formed in the valve cage for lading flow. A unitary valve guide, valve closure and stem retainer is provided. The unitary element includes a lower closure portion having a hub and a circumferential slot adapted to receive a closure seal. A fastener holds a seal retainer in engagement with a seal and with the closure portion. A valve guide portion extends upwardly from the valve closure at its periphery and is generally circular for a large portion of its circumference. The guide portion includes a guide portion opening on one side. A retainer portion located radially inwardly from the guide portion extends upwardly from the closure portion. The retainer portion is also circular and includes a stem opening in its center portion. This stem opening extends radially outwardly and aligns with the guide portion opening. The valve stem is inserted through the guide portion opening and the stem opening. A stem closure is provided which closes the stem opening to hold the valve stem in place.

9 Claims, 6 Drawing Figures

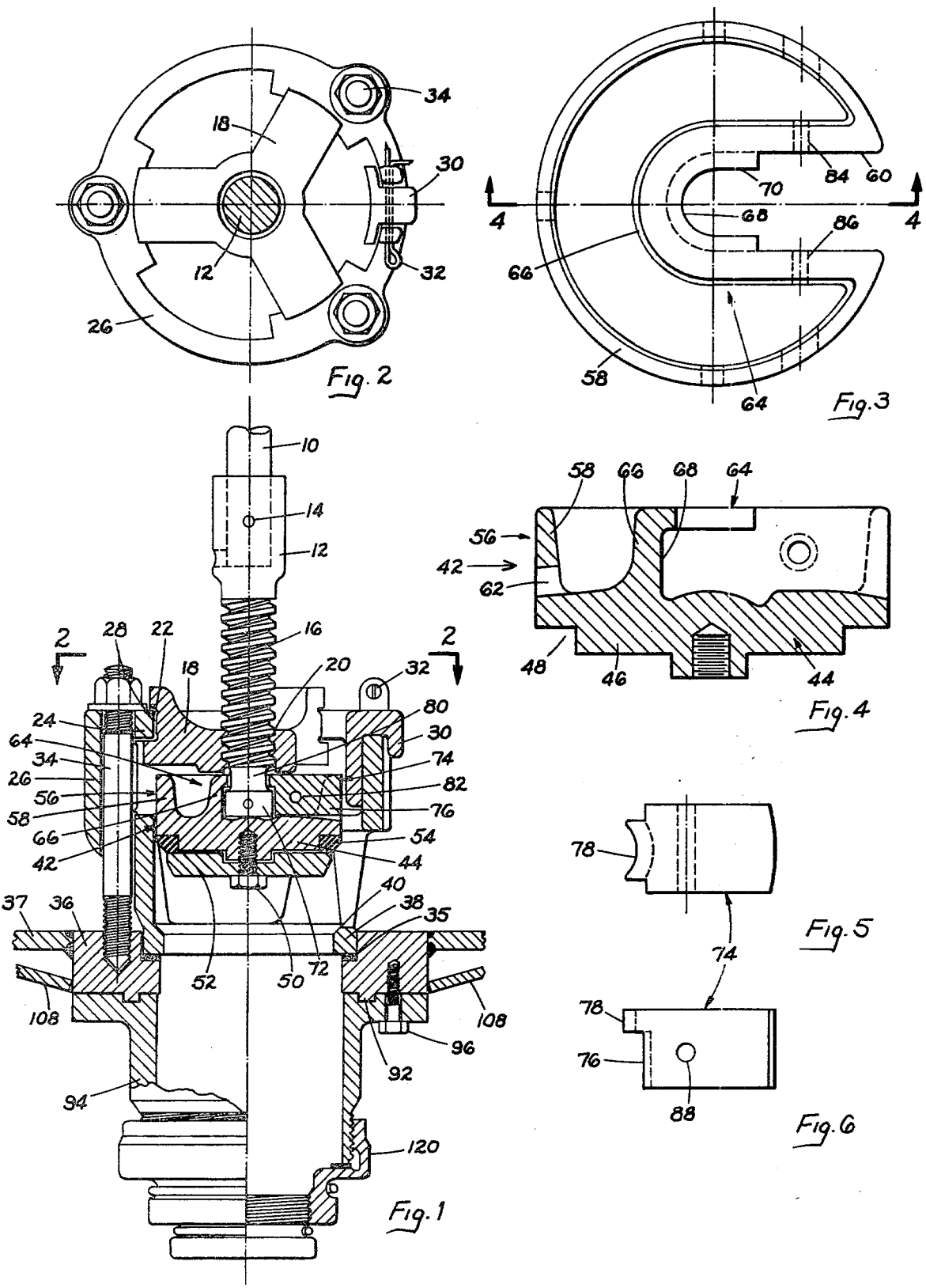

TOP OPERATED OUTLET VALVE WITH UNITARY CLOSURE GUIDE AND RETAINER

BACKGROUND OF THE INVENTION

In application Ser. No. 969,024 filed Dec. 13, 1978 a top operated tank car valve assembly includes a rod extending downwardly from the top of the tank and is attached to a valve stem of a lading valve located in the bottom of the tank. The stem engages a horizontally extending threaded valve sleeve provided with a mounting flange which engages a cooperating mounting flange on a valve cage. Fasteners extend through the valve cage and engage threaded openings in a tank car bottom outlet mounting flange. The cage includes a valve seat for a valve closure movable between opened and closed positions relative to the valve seat. The valve seat is formed on the lower, internal surface of the valve cage, and circumferentially spaced openings are formed in the valve cage for lading flow.

Laterally spaced projections extend upwardly from the lading valve closure. A valve stem retainer includes a pair of formed retainer members which define a cavity or opening. The valve stem retainer engages the lower end of the valve stem with a sufficiently tight fit as to substantially reduce horizontal and angular movement of the stem relative to the stem retainer. Machined surfaces formed in the retainer members receive the projections from the lading valve closure and fasteners hold the formed retainer members in abutting relation to the closure projections.

A valve guide depends from the valve closure a sufficiently short distance as to not extend below the tank mounting flange, and thereby a skid is not required in order to comply with AAR and DOT regulations concerning projections extending below the bottom surface of a railway tank car.

However, the valve closure and retainer are formed as separate members, each requiring machining. The machining operation adds significantly to the cost of the retainer assembly.

SUMMARY OF THE INVENTION

The object of the invention is to simplify and render less expensive the valve closure, valve guide and retainer assembly.

In accordance with the present invention, a top operated tank car valve assembly includes a rod extending downwardly from the top of the tank attached to a valve stem of a lading valve located in the bottom of the tank. The stem engages a threaded valve sleeve provided with a mounting flange which engages a cooperating mounting flange on a valve cage. The valve cage engages a tank car bottom outlet mounting flange having an opening. A valve seat for a valve closure is located in the mounting flange opening. The valve cage includes circumferentially spaced openings formed in the valve cage for lading flow. A unitary valve guide, valve closure and stem retainer is provided. The unitary element includes a lower closure portion having a hub and a circumferential slot adapted to receive a closure seal. Fastening means hold a seal retainer in engagement with a seal and with the closure portion. A valve guide portion extends upwardly from the valve closure at its periphery and is generally circular for a large portion of its circumference. Since the guide portion extends upwardly above the closure and does not depend therefrom, a skid is not required in order to comply with AAR and DOT regulations. However, the guide portion includes a guide portion opening on one side. A retainer portion located radially inwardly from the guide portion extends upwardly from the closure portion. The retainer portion is also circular over a large portion of its circumference and includes a stem opening in its center portion. This stem opening extends radially outwardly and aligns with the guide portion opening. The retainer portion includes a generally horizontal top portion adapted to engage the upper surface of a lower lug on the valve stem. The valve stem is inserted through the guide portion opening and the stem opening. A stem closure is provided which closes the stem opening to hold the valve stem in place. The stem closure includes a body portion which engages the lower lug and an upper horizontal portion which engages a shaft portion of the valve stem. Removable fastening means extending through openings in the stem retainer portion and the stem closure hold the stem closure in place within the stem opening.

THE DRAWINGS

FIG. 1 is a vertical sectional view of the top operated operating assembly of the present invention with the valve closure in open position:

FIG. 2 is a horizontal sectional view looking in the direction of the arrows along the line 2—2 in FIG. 1;

FIG. 3 is a plan view of the unitary closure guide and retainer of the present invention;

FIG. 4 is a vertical sectional view looking in the direction of the arrows along the line 4—4 in FIG. 3;

FIG. 5 is a plan view of the stem closure utilized in the present invention; and FIG. 6 is a side elevation view of the stem closure shown in FIG. 5.

DESCRIPTION OF PREFERRED EMBODIMENTS

In a top operated railway tank car lading valve assembly, a rod 10 (FIG. 1) extends to the top of a railway tank car (not shown) and is operated at the top of the tank in a known manner. See application Ser. No. 969,024 filed Dec. 13, 1978, hereby incorporated into the present application by this reference. The rod 10 is attached to a stem 12 with a pin 14 in a known manner. The stem is externally threaded at 16 and engages a sleeve 18 which is internally threaded as indicated at 20. The sleeve 18 includes a slot 22 which engages a flange portion 24 of a valve cage 26 with clearance as indicated at 28. In addition, a keeper 30 holds the sleeve 18 in engagement with the cage 26 by means of a horizontally extending pin 32 as shown in FIG. 2.

Fasteners 34 extend through the cage 26 and into a tank car bottom outlet mounting flange indicated at 36 welded to tank bottom 37. The cage 26 engages a seal 35 in the outlet mounting flange and includes a valve seat 38 having an inclined seat surface 40.

In accordance with the present invention, a unitary valve guide, valve closure and stem retainer 42 is provided. The unitary element includes a lower closure portion 44 having a hub 46 (FIG. 4) and a circumferential slot 48 adapted to receive a closure seal. Fastening means 50 hold a seal retainer 52 in engagement with an elastomeric seal 54 and with the closure portion 44.

A valve guide portion 56 extends upwardly from the valve closure at its periphery and includes a generally circular wall portion 58 for a large portion of its circumference. Since the guide portion extends upwardly above the closure rather than depending below, a skid is not required in order to comply with AAR and DOT regulations regarding projections extending below the tank bottom. However, the guide portion includes a guide portion opening 60 on one side. A drain hole 62 is also provided.

A retainer portion 64 located radially inwardly from the guide portion extends upwardly from the closure portion. The retainer portion also includes a circular wall portion 66 and includes a stem opening 68 in its center portion. This stem opening extends radially outwardly and aligns with the guide portion opening 60. The retainer portion includes a generally horizontal top portion 70 adapted to engage the upper surface of a lug 72 on the closure end of the valve stem. The valve stem 12 is inserted through the guide portion opening and the stem opening 68.

A stem closure 74 (FIGS. 5 and 6) is provided which closes the stem opening to hold the valve stem in place. The stem closure includes a body portion 76 which engages the lower lug on the valve stem and an arcuate upper horizontal portion 78 which engages a shaft portion 80 of the valve stem 12. Removable fastening means 82 extending through openings 84 and 86 in the stem retainer portion and the stem closure 88 hold the stem closure in place within the stem opening.

The unitary element 42 is preferably a casting. Stem closure 74 is also conveniently a casting.

The unitary element 42 and stem closure 74 prevent the stem 12 from being cocked relative to valve cage 26, and valve seat 40.

In closed position, seal 54 seats on valve seat inclined portion 40. Rotation of shaft 10 from the top of the car in a known manner moves closure 44 from the seated position to the open position shown in FIG. 1 in which retainer portion 64 and stem closure 74 abut sleeve 18. The lading then is removed through outlet chamber 94 after cap 120 has been removed and a suitable unloading conduit connected to the outlet chamber. Outlet chamber 94 is connected to mounting flange 36 with shearable fasteners 96.

For new cars the mounting flange 36 will not exceed one (1) inch projection below the tank bottom so that a skid is not required to comply with AAR and DOT regulations concerning projections below the tank bottom.

For existing cars the flange 36 may exceed one (1) inch and include a circumferential tongue 92. For retrofit the tongue 92 is removed and an outlet chamber 94 is attached with fasteners 96.

In addition, for retrofit a skid 108 constructed according to the teachings of one of U.S. applications Ser. No. 860,987 filed Dec. 15, 1977 and Ser. No. 958,867 filed Nov. 8, 1978, both hereby incorporated into this application by this reference, is provided to meet AAR and DOT regulations concerning projections below the tank bottom.

What is claimed is:

1. In a top operated tank car valve assembly including a rod extending downwardly from the top of the tank and attached to a valve stem of a lading valve located in the bottom of the tank; said stem engaging a threaded valve sleeve provided with a mounting flange which engages a cooperating mounting flange on a valve cage; said valve cage supported by a tank car bottom outlet mounting flange having a lading opening therein; a valve seat for a valve closure located in said lading opening; said cage including circumferentially spaced openings formed in the valve cage for lading flow into said lading opening, the improvement comprising: a unitary valve guide, valve closure and stem retainer comprising: a lower closure portion having a hub and a circumferential slot adapted to receive a closure seal; fastening means holding a seal retainer in engagement with a seal and with said closure portion; a valve guide portion extending upwardly from said valve closure portion at its periphery; said guide portion being generally circular for a large portion of its circumference; said guide portion including a guide portion opening on one side; a stem retainer portion located radially inwardly from the guide portion and extending upwardly from the closure portion; said retainer portion including a generally semi-circular stem opening in its center portion; said stem opening extending radially outwardly and aligning with said guide portion opening to provide access to said semi-circular portion where said valve stem may be inserted through the guide portion opening and the stem opening; said stem retainer portion including a generally horizontal top portion adapted to engage the upper surface of a lug located on the lower portion of said valve stem; a stem closure which closes said stem opening to hold the valve stem in place; said stem closure including a body portion engaging said lower lug on the valve stem, and an upper horizontal portion engaging a shaft portion of said valve stem; and removable fastening means to hold said stem closure in place within said stem opening.

2. A top operated tank car valve assembly according to claim 1 wherein said valve guide portion includes a generally circular valve guide wall portion.

3. A top operated tank car valve assembly according to claim 2 wherein said stem retainer portion comprises a generally circular wall portion spaced radially inwardly from said valve guide wall portion to define a generally circular slot therebetween.

4. A top operated tank car valve assembly according to claim 1 wherein said tank car bottom outlet flange does not extend below the tank bottom in excess of one (1) inch.

5. A top operated tank car valve assembly according to claim 1 wherein the assembly is applied to retrofit existing tank cars and wherein said bottom outlet flange does extend below the tank bottom in excess of one (1) inch and wherein a skid is attached to said bottom outlet flange.

6. A top operated tank car valve assembly according to claim 1 wherein said stem closure upper horizontal portion is arcuate.

7. A top operated tank car valve assembly according to claim 6 wherein said unitary valve guide, valve closure and stem retainer is a casting.

8. A top operated tank car valve assembly according to claim 7 wherein said stem closure is a casting.

9. A top operated tank car valve assembly according to claim 1 wherein said removable fastening means comprises a fastener extending through openings located in said stem closure and said stem retainer portion.

* * * * *